(12) United States Patent
Daeuber et al.

(10) Patent No.: US 11,027,695 B2
(45) Date of Patent: Jun. 8, 2021

(54) BELT RETRACTOR HAVING A SECOND FORCE LIMITER

(71) Applicant: TRW AUTOMOTIVE GMBH, Alfdorf (DE)

(72) Inventors: Markus Daeuber, Eislingen (DE); Stefan Eisele, Wissgoldingen (DE); Martin Roehrle, Mutlangen (DE)

(73) Assignee: TRW AUTOMOTIVE GMBH, Alfdorf (DE)

( * ) Notice: Subject to any disclaimer, the term of this patent is extended or adjusted under 35 U.S.C. 154(b) by 85 days.

(21) Appl. No.: 16/090,606

(22) PCT Filed: Apr. 5, 2017

(86) PCT No.: PCT/EP2017/058078
§ 371 (c)(1),
(2) Date: Oct. 2, 2018

(87) PCT Pub. No.: WO2017/174641
PCT Pub. Date: Oct. 12, 2017

(65) Prior Publication Data
US 2019/0111888 A1    Apr. 18, 2019

(51) Int. Cl.
*B60R 22/46* (2006.01)
*B60R 22/34* (2006.01)
*B60R 22/28* (2006.01)

(52) U.S. Cl.
CPC ...... *B60R 22/4676* (2013.01); *B60R 22/3413* (2013.01); *B60R 22/4628* (2013.01); *B60R 22/4633* (2013.01); *B60R 2022/285* (2013.01); *B60R 2022/468* (2013.01)

(58) Field of Classification Search
CPC ............ B60R 22/4676; B60R 22/4628; B60R 22/3413; B60R 22/4633; B60R 2022/468; B60R 2022/285
See application file for complete search history.

(56) References Cited

U.S. PATENT DOCUMENTS

| 6,616,081 | B1 * | 9/2003 | Clute | B60R 22/3413 242/379.1 |
| 6,936,303 | B1 * | 8/2005 | Katsuda | B60R 21/2644 29/592.1 |
| 9,751,494 | B2 * | 9/2017 | Roehrle | B60R 22/3413 |
| 10,507,789 | B2 * | 12/2019 | Yanagawa | B60R 22/4676 |
| 10,518,744 | B2 * | 12/2019 | Miida | B60R 22/4628 |
| 10,744,975 | B2 * | 8/2020 | Yanagawa | B60R 22/46 |

(Continued)

FOREIGN PATENT DOCUMENTS

DE   102007050867   4/2009

*Primary Examiner* — Darlene P Condra
(74) *Attorney, Agent, or Firm* — Tarolli, Sundheim, Covell & Tummino LLP

(57) ABSTRACT

The invention relates to a belt retractor comprising a frame (10), a belt reel (12) rotatably arranged within the frame, a blocking mechanism (18) by which the belt reel (12) can be blocked within the frame (10), and a load limiter (14) which is detachably coupled to the belt reel (12), characterized in that for coupling the load limiter (14) at least one load-transmitting bar (28) is used which is arranged at the belt reel (12) and is retained in a coupling position by a support ring (32), wherein the support ring (32) can be moved from a supporting position to a release position by means of an actor (70).

20 Claims, 9 Drawing Sheets

(56) References Cited

U.S. PATENT DOCUMENTS

| | | | |
|---|---|---|---|
| 2007/0228204 A1* | 10/2007 | Lenning | B60R 22/3413 |
| | | | 242/388 |
| 2010/0155519 A1 | 6/2010 | Moedinger et al. | |
| 2016/0244021 A1* | 8/2016 | Hiramatsu | B60R 22/4628 |
| 2017/0259779 A1* | 9/2017 | Sasahara | B60R 22/28 |

* cited by examiner

BELT RETRACTOR HAVING A SECOND FORCE LIMITER

RELATED APPLICATIONS

This application corresponds to PCT/EP2017/058078, filed Apr. 5, 2017, which claims the benefit of German Application No. 10 2016 106 304.5, filed Apr. 6, 2016, the subject matter of which are incorporated herein by reference in their entirety.

BACKGROUND OF THE INVENTION

The invention relates to a belt retractor comprising a frame, a belt reel rotatably disposed in the frame, a blocking mechanism by which the belt reel can be blocked within the frame, and a load limiter.

Said belt retractor is known from DE 10 2008 063 639 A1. It serves for providing a seat belt for a vehicle occupant of an automotive vehicle. During normal operation the vehicle occupant can freely unwind the seat belt from the belt reel against the action of a wind-up spring, and the belt reel winds up the seat belt again when the vehicle occupant unfastens the seat belt, for example. In response to external parameters, such as, for example, the deceleration of the vehicle or the rotational acceleration of the belt reel during webbing extension, the blocking mechanism by which the belt reel can be blocked within the frame is activated.

When the belt reel is blocked within the frame, until a predefined load level is reached within the seat belt no more seat belt can be unwound from the belt reel; the belt reel does not rotate relative to the frame of the belt retractor, apart from minimum yielding which is due to the inherent elasticity of all components present in the flux of force.

When the predetermined load level is reached, the load limiter will become active. It enables the belt reel to rotate relative to the frame under the effect of the tensile load of the seat belt. In this way, a particular amount of seat belt is released which is available as an additional path for the deceleration of the vehicle occupant.

The load limiter employed here usually is a torsion rod which at one end is fixedly coupled to the belt reel and at the other end is fixedly coupled to the frame.

Up-to-date belt retractors usually comprise a second load limiter to the load level of which it will be changed when the afore-described load-limiting phase has been completed. In the second phase of load limitation, too, a particular amount of seat belt can be unwound from the belt reel. The load required to this end within the seat belt is below the load during the first load-limiting phase, however, in which the two load limiters usually are active in parallel so that the load level thereof is added up.

The two load-limiting phases usually are adapted to each other so that the first load-limiting phase enables the thorax of the vehicle occupant to move forward until it contacts an airbag and the second load-limiting phase enables the thorax of the vehicle occupant to immerse into the airbag.

SUMMARY OF THE INVENTION

It is the object of the invention to develop the known belt retractor to the effect that there will be more options regarding the load levels that are available during the load-limiting phases.

For achieving this object, it is provided according to the invention that the load limiter is detachably coupled to the belt reel, wherein for coupling the load limiter at least one load-transmitting bar is used which is arranged on the belt reel and is retained in a coupled position by a support ring, the support ring being adapted to be moved from a supporting position to a release position by means of an actor. As the connection between the torsion rod and the belt reel is releasable, the torsion rod may be turned off. In this way, it can be changed to a different load level with little effort. Accordingly, the coupling between the belt reel and the load limiter is very reliable, while it can be reliably released at a particular point in time. At the same time, in total a very small construction space is resulting.

In accordance with one configuration of the invention, the bar is provided to be arranged in a recess of the belt reel. In this manner, the bar can be driven by the belt reel with little effort without any further measures being required, while at the same time the bar remains adjustable in the axial direction.

Preferably, there are provided two or three bars which are arranged symmetrically, i.e. at an angular distance of 180° and, resp., 120° from each other. In the case of plural bars, the loads required to transmit the torque from the belt reel to the load limiter are uniformly distributed so that the components involved may in total be dimensioned to be smaller.

According to a preferred embodiment, a holder for retaining the support ring in the supporting position is provided. The holder prevents the support ring from inadvertently shifting and thus releasing the bars in an undesired manner.

The holder is preferably disposed on the belt reel. Thus, the support ring is fixed directly on the belt reel.

Preferably, the holder is a plastic injection-molded part. Said part may be manufactured reliably even if it has complex geometries.

Preferably, the holder is provided with plural holding arms fixing the support ring in the axial direction. The holding arms may be elastically resilient so that the support ring can be pushed onto the holder with little effort so as to be fixed there.

In accordance with a preferred embodiment of the invention, a lifting ring is provided which can be rotated between a home position in which the support ring is in its supporting position and a lifting position in which the lifting ring has axially shifted the support ring from its supporting position to the release position. The lifting ring serves for translating a rotational movement of the lifting ring achievable with little effort into an axial movement by which the support ring is ultimately displaced so far that the bars are released. The use of a rotational movement and of a lifting ring is of advantage as regards the space required.

The lifting ring is preferably disposed in a lifting case. The latter may be mounted to the frame of the belt retractor and may contain further component parts.

In particular, the lifting case is preferably provided with lifting ramps. The latter produce the desired lift of the lifting ring when the latter is rotated within the lifting case.

The lifting case may also be provided with fixing tabs for fixing the lifting ring in its initial position. In this way, the lifting ring is reliably retained at a distance from the support ring so that upon rotation of the belt reel no undesired noise or friction will occur.

Preferably, within the lifting case also the actor which is adapted to rotate the lifting ring between the initial position and the lifting position is disposed. In this way, the forces required to this end can be produced immediately within the lifting case.

The actor may preferably include a pyrotechnical charge and a piston. Said actor supplies very high actuating forces with short response times so that the coupling of the load limiter to the belt reel can be reliably released at a desired point in time.

Preferably, the piston interacts directly with the lifting ring so that it rotates the latter when the actor 80 has been activated. For this purpose, the lifting ring may include a radially projecting actuating tab with an end face of the piston 84 acting upon the latter.

The load limiter preferably is a torsion rod which, at one end, is coupled to the belt reel by means of the bar. The torsion rod is a proven and well-known component part by which the load limiter can be implemented within the belt reel in a space-saving manner.

Of preference, a second load limiter being coupled to the belt reel at the other end of the latter is provided. The second load limiter enables two different levels of load limitation to be implemented.

BRIEF DESCRIPTION OF THE DRAWINGS

Hereinafter the invention will be described by way of an embodiment as illustrated in the enclosed drawings, wherein.

DESCRIPTION

Figure 1:
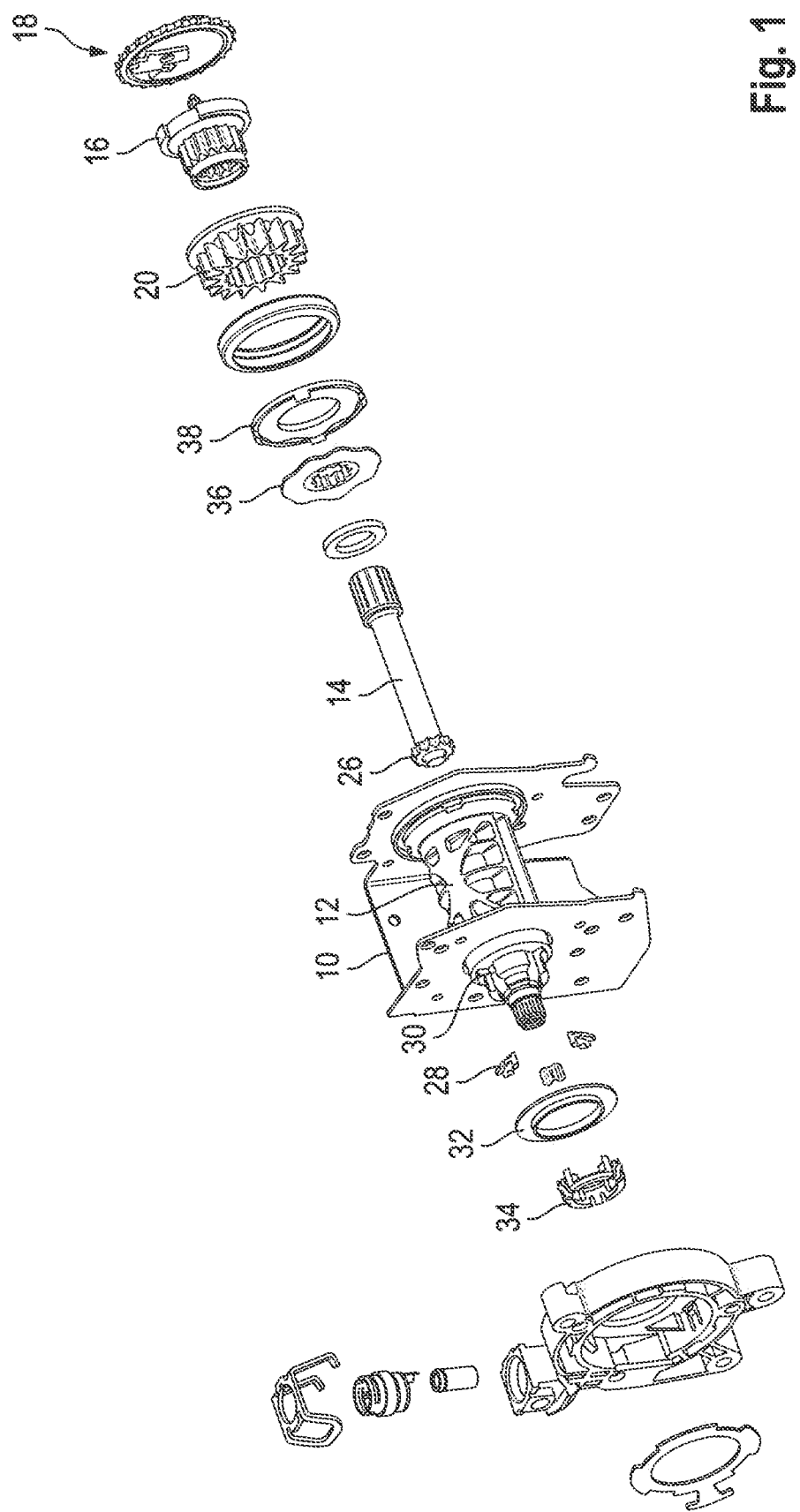
FIG. 1 shows an exploded view of the belt retractor according to the invention.
Figure 2:
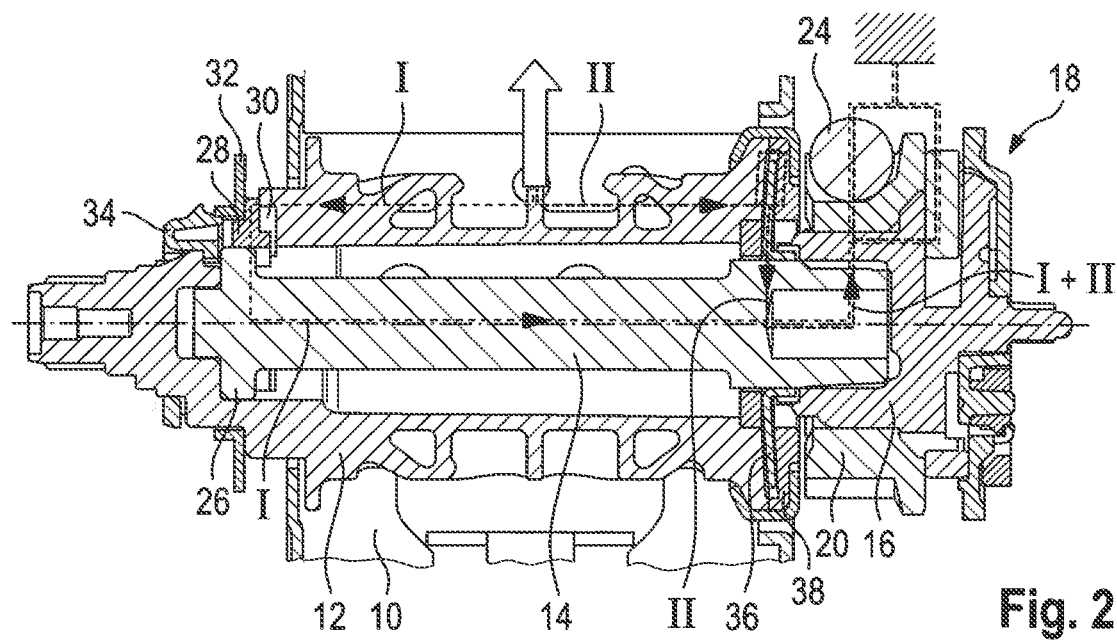
FIG. 2 shows a section across the belt retractor of FIG. 1.

By way of FIGS. 1 and 2, initially the general structure of the belt retractor is explained.

The belt retractor as a self-supporting component includes a frame 10 in which a belt reel 12 is arranged.

A torsion rod 14 which is the core part of the load limiter extends through the belt retractor. The torsion rod 14 is assigned at one end (the left end in the Figures) to the belt reel 12 and at the other end (the right end in the Figures) is accommodated in a hub 16 in a rotationally fixed manner. At the hub a blocking mechanism 18 not explained in more detail here is disposed which serves for blocking the hub 16 fixedly relative to the frame 10, where necessary.

Figure 13:
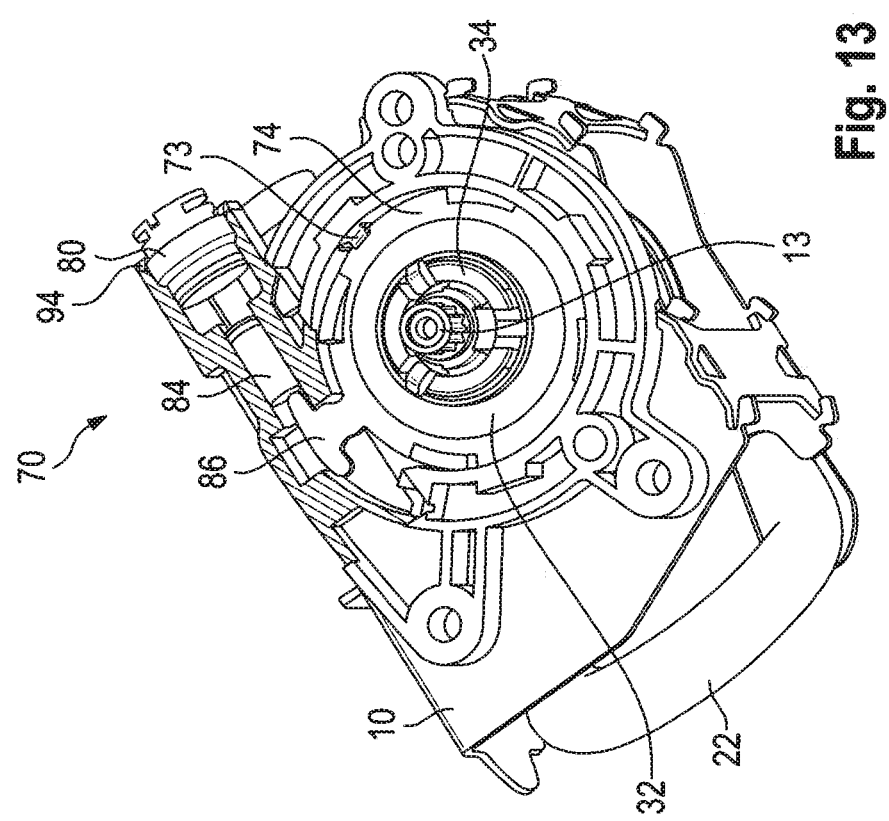
FIG. 13 shows a perspective partially cut view of the actuator of FIG. 12 mounted on the belt retractor, with the actuator being provided in the initial position.

Also, a drive wheel 20 is connected to the hub 16 in a rotationally fixed manner, with a so-called pre-tensioner, for example an electric motor, or a main tensioner, for example a load transmission element 24 adjustable in a piston 22 visible in FIG. 13 by a pyrotechnical charge, being capable of acting upon said drive wheel.

The effects of the pre-tensioner and of the main tensioner are generally known and therefore shall be explained only roughly here. The pre-tensioner serves for rotating the belt reel in the winding direction, where necessary, so that the webbing is tensioned up to a particular pre-tensioning load. This operation is reversible. The main tensioner serves for driving the belt reel in the winding direction, where necessary, so that a definitely higher tensioning load is obtained within the webbing. The main tensioner can be activated merely once.

At its end associated with the belt reel 12 the torsion rod 14 is provided with a driving toothing 26 in which the points of plural bars 28 engage, the bars being arranged in corresponding recesses 30 of the belt reel. There the bars 28 are retained by a support ring 32 which is fixed on the belt reel 12 by means of a holder 34.

When a torque is exerted on the belt reel 12, for example by tension acting on the seat belt, said torque is transmitted via the edges of the recesses 30 and the bars 28 to the torsion rod 14 and from there into the hub 16. Assuming that the hub 16 is blocked fixedly relative to the frame, also the belt reel 12 is prevented from rotating relative to the frame, in any case as long as the acting torque is below the torque at which the torsion rod 14 is plastically twisted. The load transmission path mentioned here is indicated by broken lines in FIG. 2 with reference numeral I.

On the side of the belt reel 12 opposed to the bars 28, a corrugated disk 36 which is a central component of a further load limiter is arranged. The corrugated disk 36 is connected to the torsion rod 14 in a rotationally fixed manner at the end thereof associated with the hub 16 and is elastically clamped in the axial direction between an end face of the belt reel 12 and a cover 38.

The corrugated disk 36 may be rotated between the belt reel 12 and the cover 38, when the acting torque is higher than a holding torque of the corrugated disk 36 which is composed of a friction component and a resistance of the corrugated disk against deformation.

With respect to the second load limiter, a second load path inserted in FIG. 2 by broken lines with reference numeral II extends from the belt reel to the corrugated disk, from the corrugated disk into the torsion rod and from the latter ultimately into the hub 16.

Figure 3:
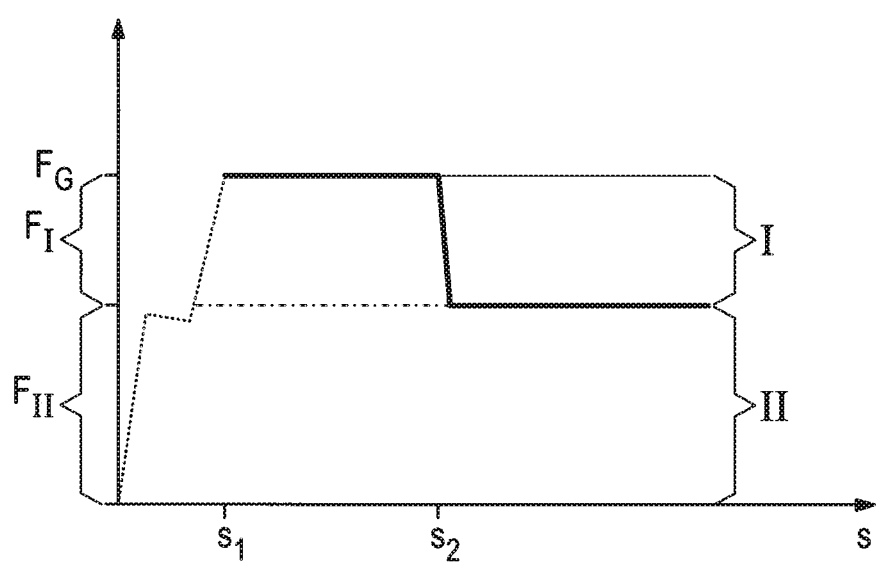
FIG. 3 shows a diagram of the acting webbing load over the length of extended webbing.

By way of FIG. 3, the load limitation shall be explained as follows.

In the initial condition, both the load limiter utilizing the torsion rod 14 and the load limiter utilizing the corrugated disk 36 are active. In the diagram of FIG. 3, this corresponds to a webbing extension from $s_1$ to $s_2$. In this phase, the two load limiters act in parallel so that in the seat belt a total load $F_G$ is resulting herefrom which is composed of a load $F_I$ defined by the torsion rod 14 and a load $F_{II}$ defined by the corrugated disk 36.

At the point $s_2$ the load limiter utilizing the torsion rod 14 is switched off so that only the load limiter utilizing the corrugated disk 36 continues to be active. Accordingly, the load within the webbing decreases to the load $F_{II}$.

Hereinafter, the structure of the load limiter comprising the corrugated disk 36 shall be explained in detail by way of FIGS. 4 to 8.

The corrugated disk 36 has a flat disk-shaped portion 40 in the initial condition.

At its inner circumferential edge, the corrugated disk 36 includes a collar 42 extending in the axial direction. The collar 42 is formed integrally with the disk-shaped portion 40 and shows a driver design, here in the form of a toothed profile.

The toothed profile of the driver design 42 of the corrugated disk 36 is fixedly attached to an external toothing 44 by which the torsion rod 14 is also fixedly accommodated within the hub 16. Thus, the corrugated disk 36 is coupled in a rotationally fixed manner both to the right end of the torsion rod 14 in the Figures and to the hub 16.

The corrugated disk 36, more exactly speaking the disk-shaped portion 40 thereof, is arranged between a first corrugated surface 46 and a second corrugated surface 48.

The first corrugated surface 48 is one of the end faces of the belt reel 12. As is evident especially from FIG. 4a and from FIG. 7, the first corrugated surface 48 is provided with a sinusoidal profile at its edge located outside in the radial direction (cf. also FIG. 8). As is evident from the projection P of the profile of the first corrugated disk 48 related to FIG. 7, the outer circumference A extends in sinusoidal shape, while the inner circumference I forms a flat circle. For the concrete contour at the outer circumference, the following formula has turned out to be reasonable (cf. also the coordinate system inserted in FIG. 8): $y = 0.8 \cdot \sin x$.

The second corrugated surface 48 is configured as the inner surface of the cover 38. The contour of the second corrugated surface 48 corresponds to the contour of the first corrugated surface 46: At the inner circumference of the cover 38 the second corrugated surface 48 extends along a flat circle, while the second corrugated surface shows a sinusoidal curve at its outer circumference (cf. especially FIG. 4a).

Figure 4A:
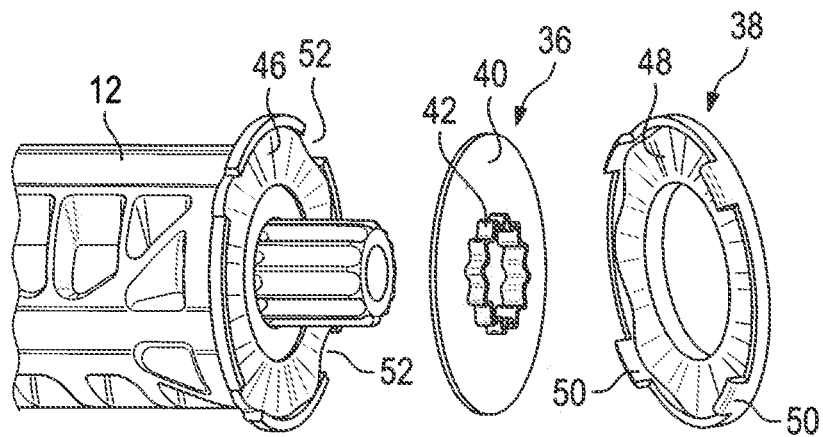
FIGS. 4a to 4c show a perspective view of different steps of mounting the corrugated disk to the belt reel.
Figure 4B:
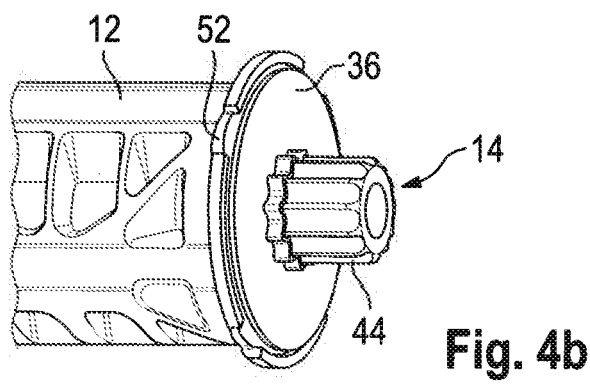
Figure 4C:
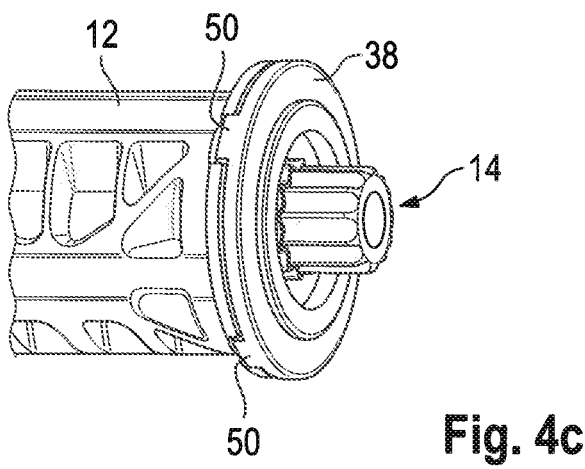

When the corrugated disk 36 is mounted, it is pushed onto the torsion rod 14 disposed inside the belt reel 12, more exactly speaking to the outer toothing 44 thereof (cf. FIGS. 4a and 4b). Subsequently, the cover 38 is pushed on in the axial direction, wherein said cover is provided with plural lands 50 which engage in corresponding recesses 52 being provided outside the first corrugated surface 46 at the outer circumference of the belt reel 12. In this way, the cover 38 is fixed to the belt reel 12 in a rotationally fixed manner (cf. FIG. 4c), but in the pre-assembled state it is axially movable.

Figure 5A:
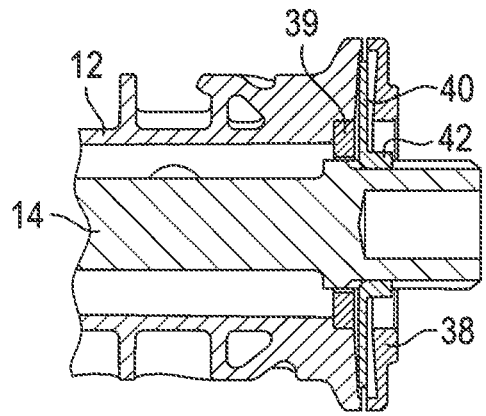
FIGS. 5a and 5b show a schematic sectional view of two steps when mounting the corrugated disk to the belt reel.
Figure 6A:
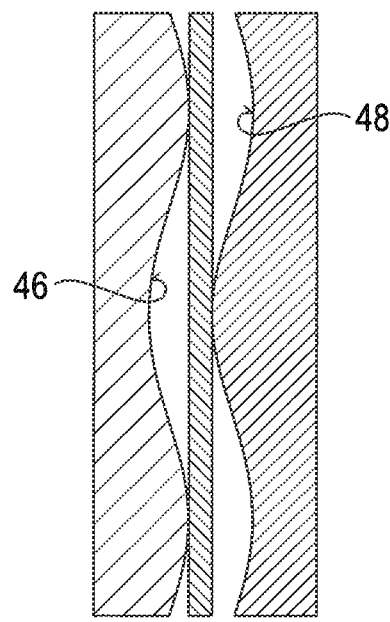
FIGS. 6a and 6b show a schematic section of the corrugated disk between the corrugated surfaces associated therewith during the mounting steps of FIGS. 5a and 5b.

In said pre-assembled state, the disk-shaped portion 40 of the corrugated disk 36 defines the distance between the first and second corrugated surfaces 46, 48 (cf. FIGS. 5a and 6a).

In order to completely mount the corrugated disk 36 with respect to its function as a load limiter, a crimping ring 54 having a C-shaped cross-section in the initial condition is pushed onto the cover 38. The cover 38 together with the crimping ring 54 then is pressed against the belt reel 12 in the axial direction until the disk-shaped portion 40 of the corrugated disk is deformed between the two corrugated surfaces 46, 48 (cf. especially FIG. 6b), and the portion of the crimping ring 54 associated with the belt reel 12 is flanged or crimped in the direction of the arrow P of FIG. 5b so that the cover 38 is tightly attached to the belt reel 12 in the axial direction.

Inside the end face of the belt reel 12 forming the first corrugated surface 46, the torsion rod 14 is supported in a bearing ring 39 in the area of the outlet from the belt reel 12.

In this way, also the corrugated disk is centered between the belt reel 12 and the cover 38.

Figure 5B:
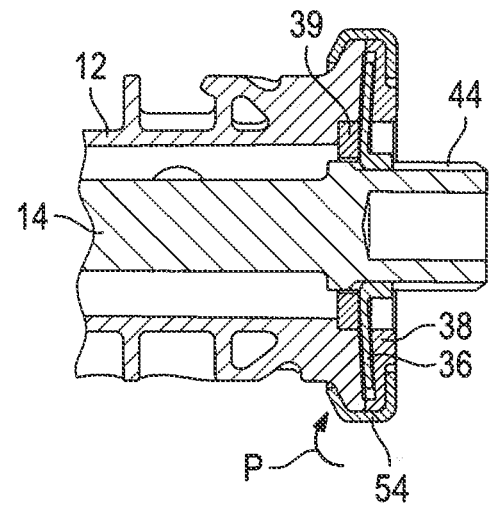
Figure 6B:
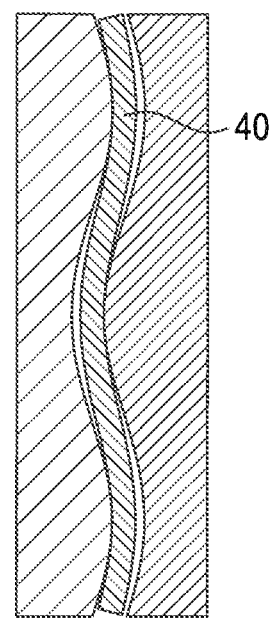
Figure 7:
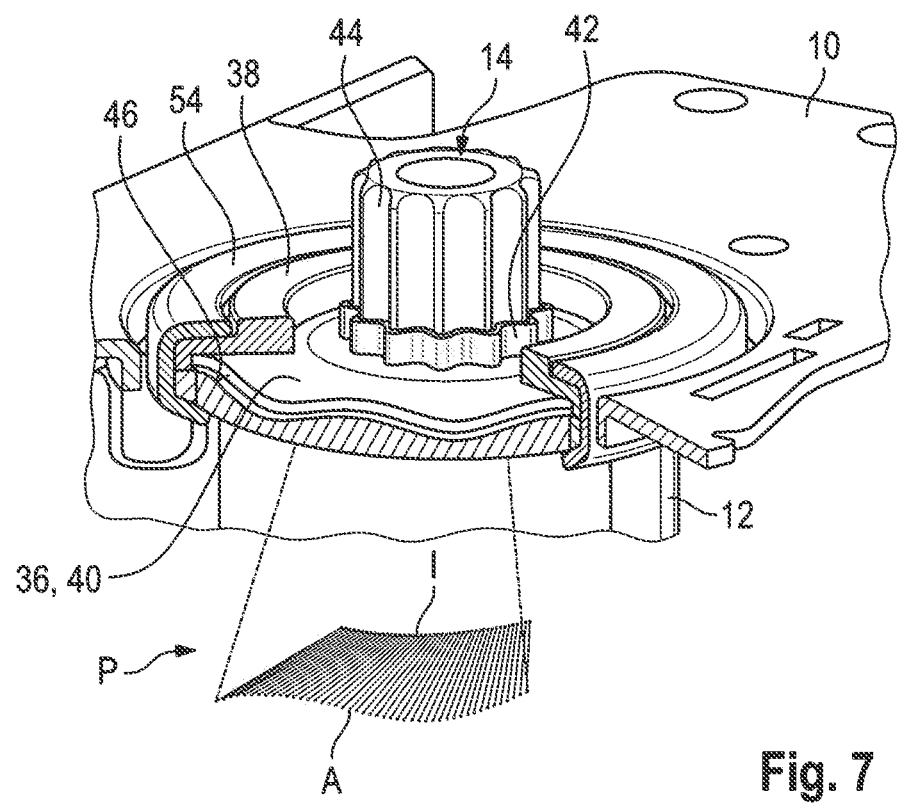
FIG. 7 shows a perspective partially cut view of the corrugated disk in the completely mounted state.
Figure 8:
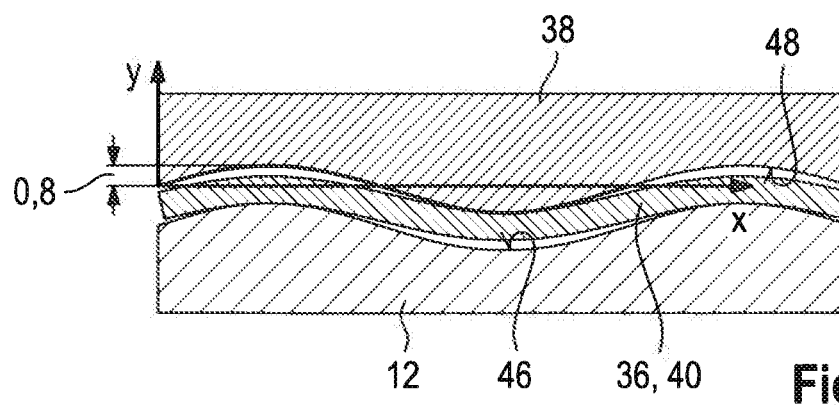
FIG. 8 shows a detail of the corrugated disk disposed between the corrugated surfaces in a schematic sectional view.
Figure 9:
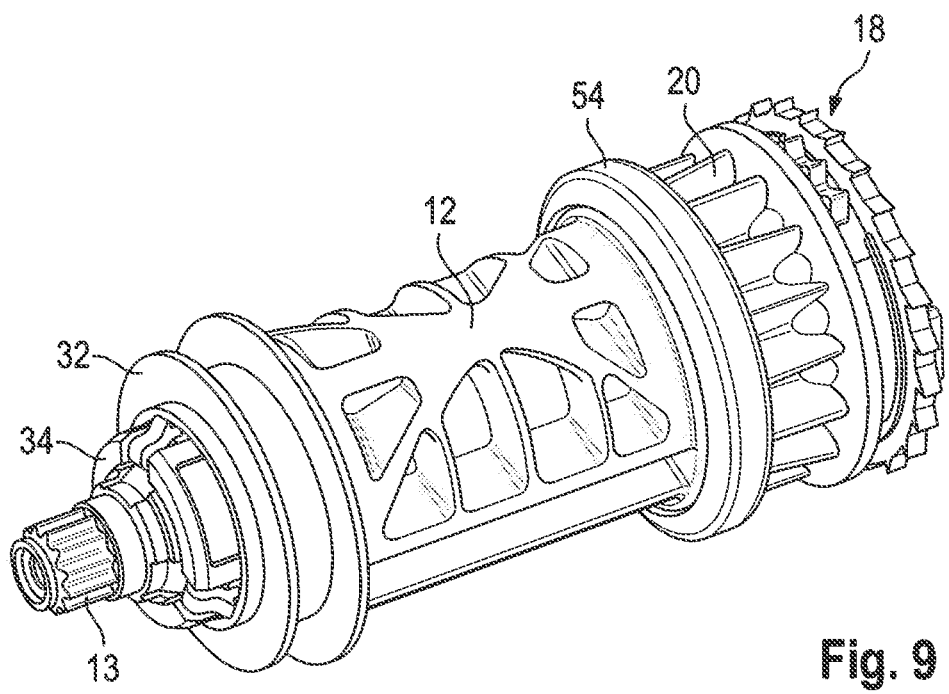
FIG. 9 shows a perspective view of the completely mounted belt reel.

When considering, for example, FIGS. 5b and 6b, it is evident that, when the end of the torsion rod 14 provided with the external toothing 44 is rotated relative to the belt reel 12, the corrugated disk 36 rotates relative to and between the corrugated surfaces 46, 48. The corrugated disk 36 counters said rotation by a resistance moment that is composed of a friction component and a deformation force component.

The friction component is defined by the surface nature and the contact force between the corrugated disk 36, on the one hand, and the two corrugated surfaces 46, 48, on the other hand. The deformation force component is defined by the resistance of the disk-shaped portion 48 which the latter sets against continuous deformation along the sinusoidal contour of the two corrugated surfaces 46, 48. In other words: By rotation of the corrugated disk 36 relative to the corrugated surfaces 46, 48 the corrugated disk 36 will be continuously bent in opposite directions especially along its outer circumference.

By way of the FIGS. 9 to 14, the structure of the load limiter utilizing the torsion rod 14 shall hereinafter be described.

It is the substantial characteristic of the load limiter utilizing the torsion rod 14 that the belt reel 12 can be uncoupled from the torsion rod 14. In this state, solely the load limiter utilizing the corrugated disk 36 is active.

In the initial condition of the belt retractor, viz. during "normal operation", the belt reel 12 is tightly coupled to the torsion rod 14, however. For this purpose, the bars 28 already mentioned before are used which are arranged in recesses 30 of the belt reel 12.

Figure 10:
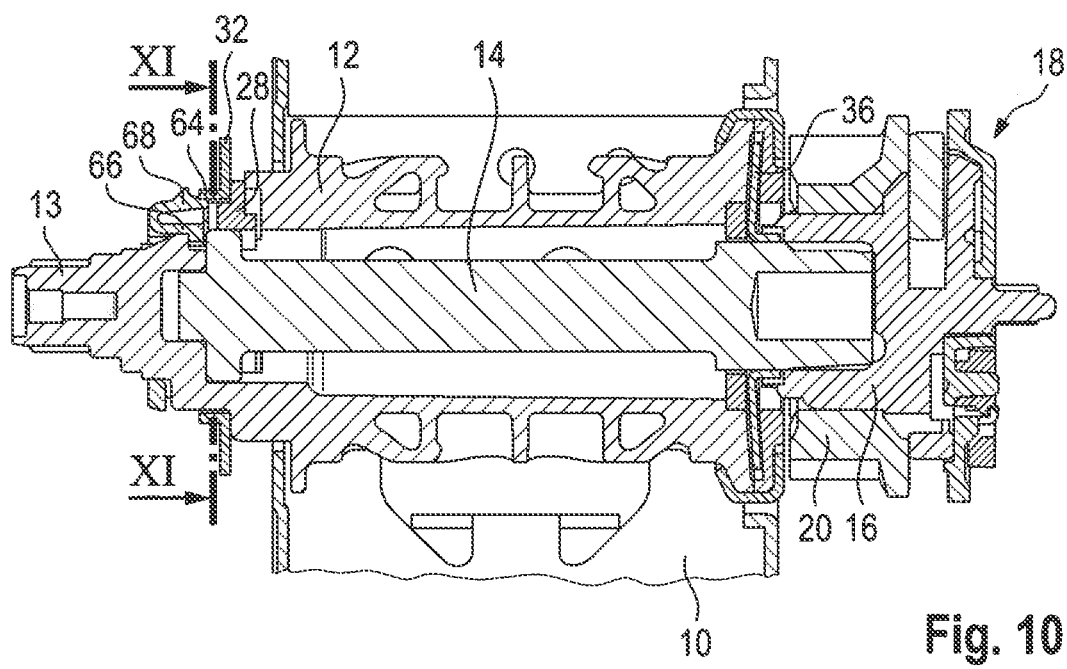
FIG. 10 shows a section across the belt reel of FIG. 9.
Figure 11:
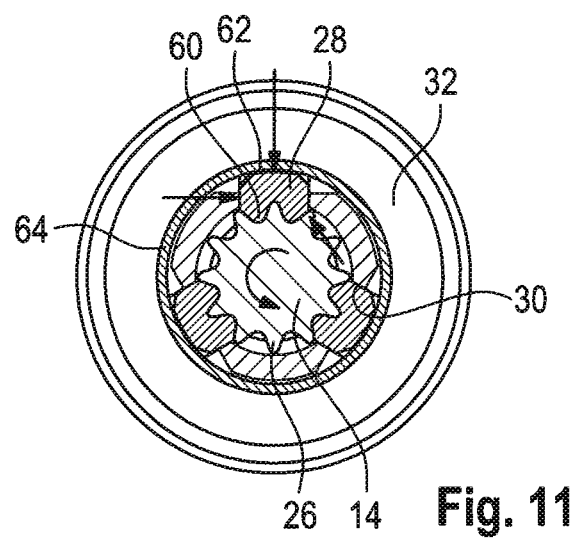
FIG. 11 shows a section along the plane XI-XI of FIG. 10.

The bars 28 are illustrated more clearly in the FIGS. 10 and 11. At their radially inner end they include two teeth 60 which engage in the driver toothing 26 of the torsion rod 14.

In the position shown in FIG. 11 in which the bars 28 are located inside the recesses 30 and the teeth 60 engage in the driver toothing 26, a torque can be transmitted from the belt reel 12 to the torsion rod 14. This is accomplished by the fact that the edge of the corresponding recess 30 located at the rear in the direction of rotation drives the bar 28 and the latter in turn rotates the driver toothing 26 of the torsion rod 14 via the flanks of the teeth 60 located at the front in the circumferential direction.

The support ring 32 is in charge of the fact that during torque transmission the bars 28 are not pressed outwardly out of the recesses 30. More exactly speaking, each of the bars 28 abuts, with a shoulder 62, on the inner circumference of the support ring 32.

The support ring 32 in this case is provided with a support collar 64 bent in the axial direction.

In the position shown in the FIGS. 9 to 14, the support ring 32 is fixed by the holder 34 briefly mentioned in the foregoing.

The holder 34 is a plastic injection-molded part which is cage-shaped. In the broadest sense, the holder 34 is ring-shaped so that it is pushed onto an extension 13 of the belt reel 12.

The holder 34 includes plural radially inwardly effective detent arms 66 by which it is fixed on the belt reel 12 in the axial direction.

Moreover, the holder 34 includes plural radially outwardly acting retaining arms 68 to which the support collar 64 of the support ring 32 is adjacent. In this way, the support ring 32 is fixed on the belt reel 12 in the axial direction so that it supports the bars 28 in the radial direction in order to prevent the latter from leaving the recesses 30 when a torque is transmitted from the belt reel to the torsion rod.

In order to release the coupling between the belt reel 12 and the torsion rod 14, the support ring 32 may be displaced in the axial direction until it stops supporting the bars 28 in the axial direction. For this purpose, an actor 70 is provided, as especially shown in FIG. 12.

The actor 70 comprises a case 72 in which a lifting ring 74 is rotatably accommodated. The lifting ring includes, along its outer circumference, plural radially orientated abutting edges 76 which are provided for interacting with lifting ramps 78 being disposed in the case.

When the lifting ring 74 is in its initial position, the abutting edges 76 abut on the "lower" end of each lifting ramp 78, viz. relating to FIG. 13 in the area of each lifting ramp respectively provided further clockwise. When the lifting ring is rotated relative to the lifting ramps 78 (anti-clockwise relating to FIG. 13), the abutting edges 76 slide along the lifting ramps 78 so that the lifting ring 74 is shifted in the axial direction.

For adjusting the lifting ring 74 a so-called micro-gas generator 80 is provided which may be, for example, an igniter for a "large" gas generator as it is used to deploy a driver or passenger airbag. Basically, however, also any gas generator may be used which generates the desired amount of compressed gas within the desired period of time.

The micro-gas generator 80 is accommodated in a seat 82 within the case 72 which shall be referred to as lifting case hereinafter due to the lifting movement of the lifting ring 74 produced.

In the case 72 also a piston 84 which is in fluid communication with the micro-gas generator 80 is accommodated. The piston 84 abuts on an actuating tab 86 projecting from the lifting ring 74 in the radial direction. The actuating tab 86 in this case is formed integrally with the lifting ring.

Figure 14:
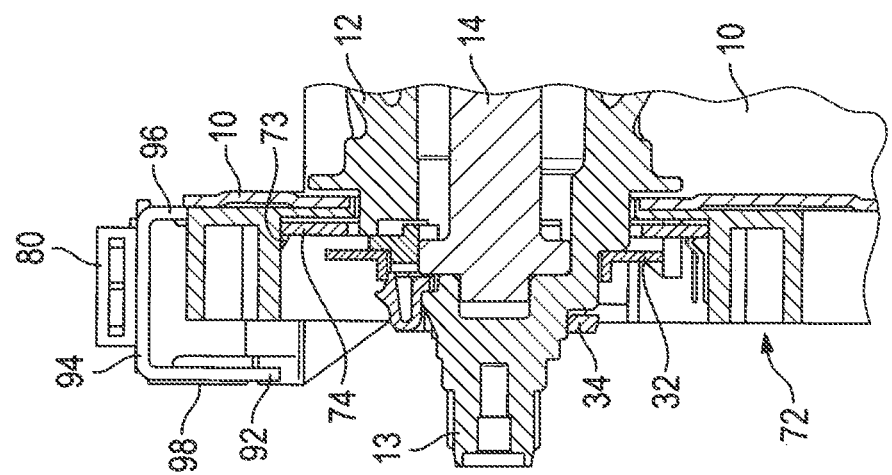
FIG. 14 schematically shows a broken-away sectional view across the belt retractor of FIG. 13 on the side of the belt reel provided with the actuator.

The lifting case 72 is attached to the frame 10 in the completely mounted state of the belt retractor (cf. FIGS. 13 and 14). The lifting ring 74 is provided in an initial position in which it is approximated to the leg of the frame 10 at which the lifting case 72 is disposed. The lifting ring 74 is located inside the support ring 32, i.e. between the support ring 32 and the area of the belt reel onto which the seat belt is wound.

The lifting ring is retained by fixing tabs 73 in its initial position so that there will be no friction with the support ring 32 rotating along with the belt reel 12.

Figure 12:
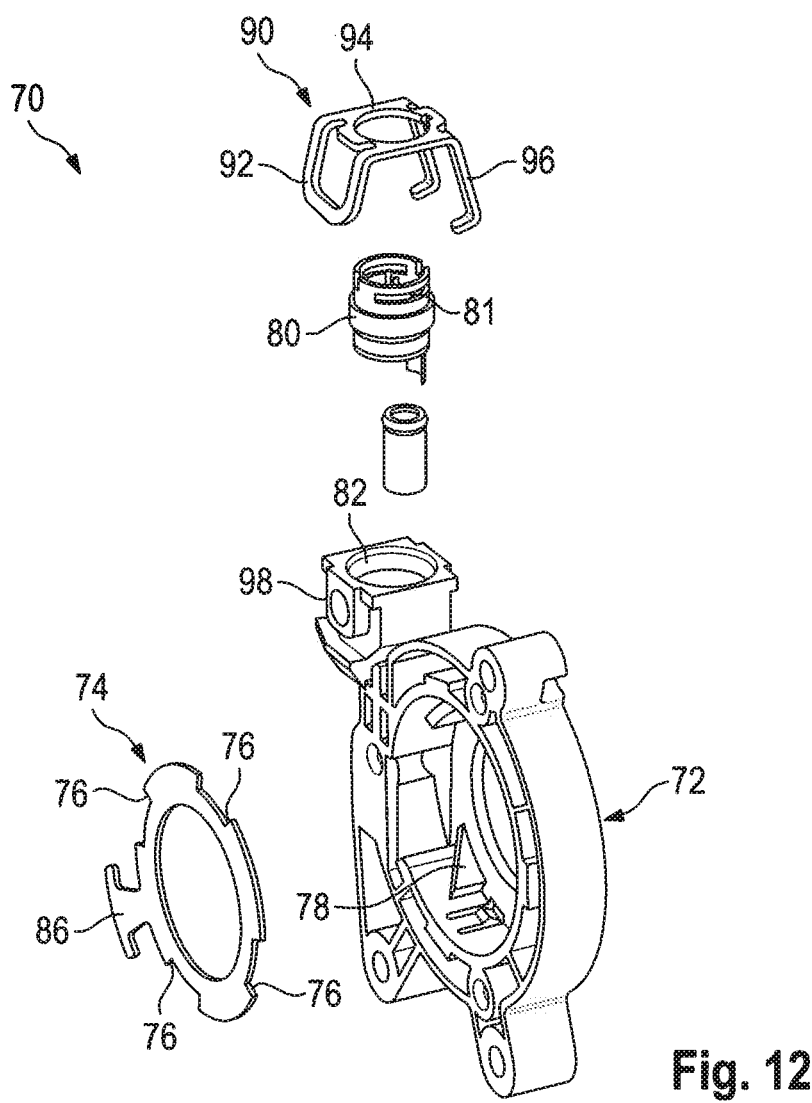
FIG. 12 shows an exploded view of an actuator employed in the belt retractor of FIG. 1.

The micro-gas generator 80 is locked in the seat 82 associated therewith within the lifting case 72 by means of a retaining clip 90 (cf. especially FIG. 12).

The retaining clip 90 is a bent sheet metal part including a bracket 92, a retaining portion 94 closed in the circumferential direction and two detent arms 96.

The bracket 92 is hooked in a counter bearing 98 provided on the lifting case 72 on the side of the seat 82 for the micro-gas generator 80.

The retaining portion 94 abuts on a shoulder 81 provided at the micro-gas generator 80 on the side facing away from the piston 84. Since the retaining portion 94 is closed in the circumferential direction, i.e. is ring-shaped, it is prevented from slipping off the micro-gas generator 80.

The detent arms 96 engage in appropriate recesses on the side of the lifting case 72 facing away from the counter bearing 98 laterally from the seat 82. As is evident especially from FIG. 14, the detent arms 96, which are located in front of and behind the sectional plane in this sectional view and therefore are not visible in FIG. 14, abut on the leg of the frame 10 on which the lifting case 72 is arranged. Therefore, they are pressed tightly against the lifting case 72 by the respective case leg so that there they are prevented from leaving the detent recesses associated with them.

In this way, the micro-gas generator 80 is positioned with little effort, though very reliably, in the seat 82 dedicated thereto within the lifting case 72.

Figure 15:
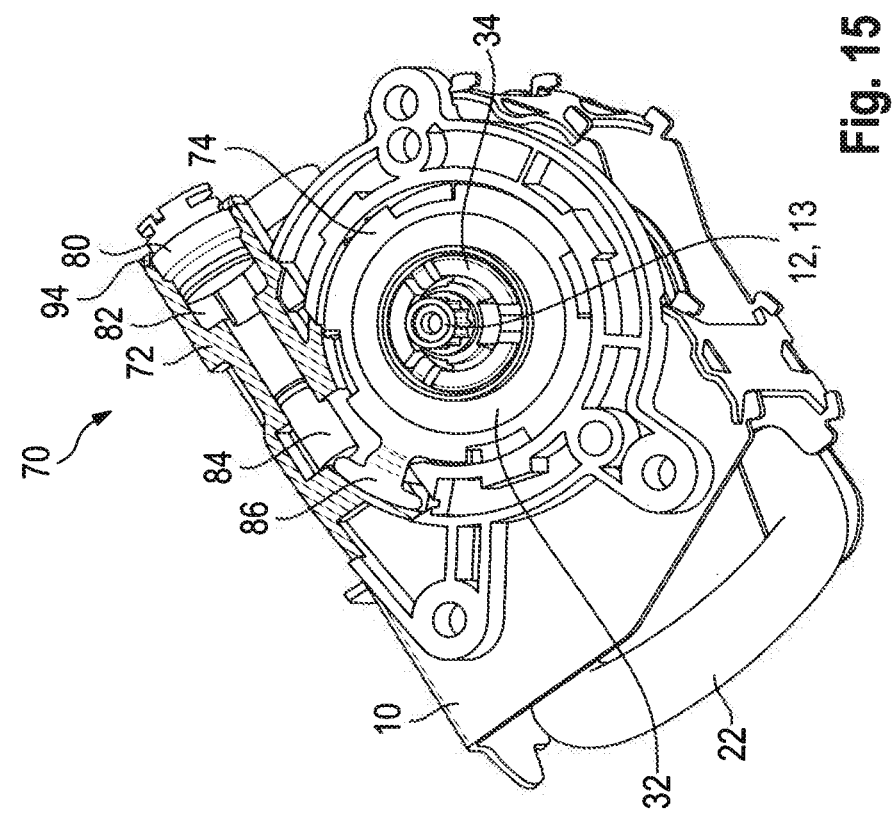
FIG. 15 shows a view corresponding to that of FIG. 13, with the actuator being provided in the released state.

When, starting from the state as shown in FIGS. 13 and 14, the micro-gas generator 80 is ignited, the piston 84 in the lifting case 72 is shifted so that the lifting ring (relating to FIGS. 13 and 15) is rotated anti-clockwise. The lifting ring 74 then performs an axial stroke due to the lifting ramps 78, namely away from the leg of the frame 10 on which the lifting case 72 is arranged outwardly in the axial direction (cf. FIGS. 14 and 16).

Figure 16:
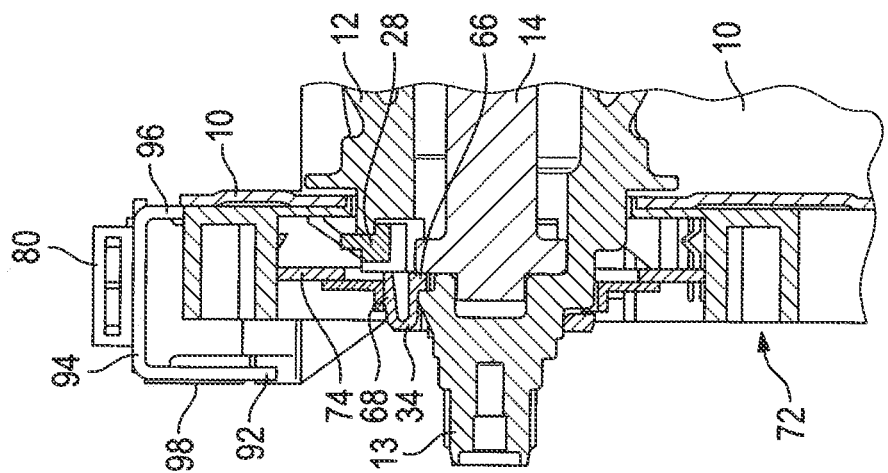
FIG. 16 shows a view corresponding to that of FIG. 14, with the actuator being provided in the released state.

During said stroke the support ring 32 is shifted relative to the holder 34 in the axial direction so far that the action of the retaining arms 68 is overcome and the support ring 32, when viewed in the axial direction, is located outside the bars 28 (cf. especially FIG. 16).

In this condition of the support ring 32, the bars 28 may yield outwardly in the radial direction, when a torque is transmitted between the belt reel 12 and the torsion rod 14. Said radial movement of the bars 28 is assisted by the flanks of the teeth 60 and of the driver toothing 26 being inclined so that a force acting radially outwardly on the bars 28 is generated.

The invention claimed is:

1. A belt retractor comprising a frame (10), a belt reel (12) rotatably arranged within the frame, a blocking mechanism (18) by which the belt reel (12) can be blocked within the frame (10), and a load limiter (14) being detachably coupled to the belt reel (12), wherein for coupling the load limiter (14) at least one load-transmitting bar (28) is used which is arranged at the belt reel (12) and is retained in a coupling position by a support ring (32), the at least one load-transmitting bar (28) engaging driving toothing (26) of the load limiter (14) when the at least one load-transmitting bar is in the coupling position, wherein the support ring (32) can be moved from a supporting position to a release position by means of an actor (70).

2. The belt retractor according to claim 1, wherein the bar (28) is arranged in a recess (30) of the belt reel (12).

3. The belt retractor according to claim 1, wherein two or three bars (28) which are arranged symmetrically are provided.

4. The belt retractor according to claim 1, wherein a holder (34) for retaining the support ring (32) in the supporting position is provided.

5. The belt retractor according to claim 4, wherein the holder (34) is attached to the belt reel (12).

6. The belt retractor according to claim 4, wherein the holder (34) is a plastic injection-molded part.

7. The belt retractor according to claim 4, wherein the holder (34) is provided with plural retaining arms (68) that fix the support ring in the axial direction.

8. The belt retractor according to claim 1, wherein a lifting ring (74) is provided which can be rotated between an initial position in which the support ring (32) is in its supporting position and a lifting position in which the lifting ring (74) has axially shifted the support ring (32) from its supporting position to the release position.

9. The belt retractor according to claim 8, wherein the lifting ring (74) is arranged in a lifting case (72).

10. The belt retractor according to claim 9, wherein the lifting case (72) is provided with lifting ramps (78).

11. The belt retractor according to claim 9, wherein the lifting case (72) is provided with fixing tabs (73) for fixing the lifting ring (74) in its initial position.

12. The belt retractor according to claim 1, wherein the actor (70) includes a pyrotechnical charge (80) and a piston (84).

13. The belt retractor according to claim 12, wherein a lifting ring (74) is provided which is rotatable by the piston (82) between an initial position in which the support ring (32) is in its supporting position and a lifting position in which the lifting ring (74) has axially shifted the support ring (32) from its supporting position to the release position.

14. The belt retractor according to claim 13, wherein the lifting ring (74) includes a radially projecting actuating tab (86).

15. The belt retractor according to claim 1, wherein the load limiter is a torsion rod (14) which at one end is coupled to the belt reel (12) by means of the bar (28).

16. The belt retractor according to claim 15, wherein a second load limiter (36) is coupled to an end of the belt reel (12) that is opposed to the at least one load-transmitting bar (28).

17. A belt retractor, comprising:
a frame (10);
a belt reel (12) rotatably arranged within the frame (10);
a blocking mechanism (18) by which the belt reel (12) can be blocked within the frame (10);
a load limiter (14) being detachably coupled to the belt reel (12);
at least one load-transmitting bar (28) arranged at the belt reel (12), the at least one load-transmitting bar (28) having a coupling position in which the at least one load-transmitting bar couples the load limiter (14) to the belt reel (12);
a support ring (32) being movable between a supporting position in which the support ring retains the at least one load-transmitting bar (28) in the coupling position and a release position in which the support ring releases the at least one load-transmitting bar from the coupling position;
a holder (34) for retaining the support ring (32) in the supporting position;
the holder (34) being provided with plural retaining arms (68) that fix the support ring (32) in an axial direction; and
an actor (70) for moving the support ring (32) from the supporting position to the release position.

18. The belt retractor according to claim 17, wherein a portion of the holder (34) that retains the support ring (32) in the supporting position is overcome as the support ring moves from the supporting position to the release position.

19. A belt retractor, comprising:
a frame (10);
a belt reel (12) rotatably arranged within the frame (10);
a blocking mechanism (18) by which the belt reel (12) can be blocked within the frame (10);
a first load limiter (14) detachably coupled to the belt reel (12);
a second load limiter (36) connected to the first load limiter (14) in a rotationally fixed manner, the second load limiter (36) engaging and being rotatable relative to a surface (46) of the belt reel (12), rotation of the second load limiter (36) being countered by at least the friction between the second load limiter and the surface (46) of the belt reel (12);
at least one load-transmitting bar (28) arranged at the belt reel (12), the at least one load-transmitting bar (28) having a coupling position in which the at least one load-transmitting bar couples the first load limiter (14) to the belt reel (12);
a support ring (32) being movable between a supporting position in which the support ring retains the at least one load-transmitting bar (28) in the coupling position and a release position in which the support ring releases the at least one load-transmitting bar from the coupling position; and
an actor (70) for moving the support ring (32) from the supporting position to the release position.

20. A belt retractor, comprising:
a frame (10);
a belt reel (12) rotatably arranged within the frame (10);
a blocking mechanism (18) by which the belt reel (12) can be blocked within the frame (10);
a load limiter (14) being detachably coupled to the belt reel (12);
at least one load-transmitting bar (28) arranged at the belt reel (12), the at least one load-transmitting bar (28) having a coupling position in which the at least one load-transmitting bar couples the load limiter (14) to the belt reel (12);
a support ring (32) being movable between a supporting position in which the support ring retains the at least one load-transmitting bar (28) in the coupling position and a release position in which the support ring releases the at least one load-transmitting bar from the coupling position;
a holder (34) for retaining the support ring (32) in the supporting position, a portion of the holder (34) that retains the support ring (32) in the supporting position being overcome as the support ring moves from the supporting position to the release position; and
an actor (70) for moving the support ring (32) from the supporting position to the release position.

* * * * *

UNITED STATES PATENT AND TRADEMARK OFFICE
CERTIFICATE OF CORRECTION

| | |
|---|---|
| PATENT NO. | : 11,027,695 B2 |
| APPLICATION NO. | : 16/090606 |
| DATED | : June 8, 2021 |
| INVENTOR(S) | : Markus Daeuber et al. |

It is certified that error appears in the above-identified patent and that said Letters Patent is hereby corrected as shown below:

On the Title Page

Please add (30) Foreign Application Priority Data --DE 10 2016 106 304.5 filed on April 6, 2016--

Signed and Sealed this
Seventh Day of September, 2021

Drew Hirshfeld
*Performing the Functions and Duties of the*
*Under Secretary of Commerce for Intellectual Property and*
*Director of the United States Patent and Trademark Office*